Jan. 10, 1961     T. C. LEIGHTON     2,967,430
STABILIZER GIMBALS
Filed July 28, 1958
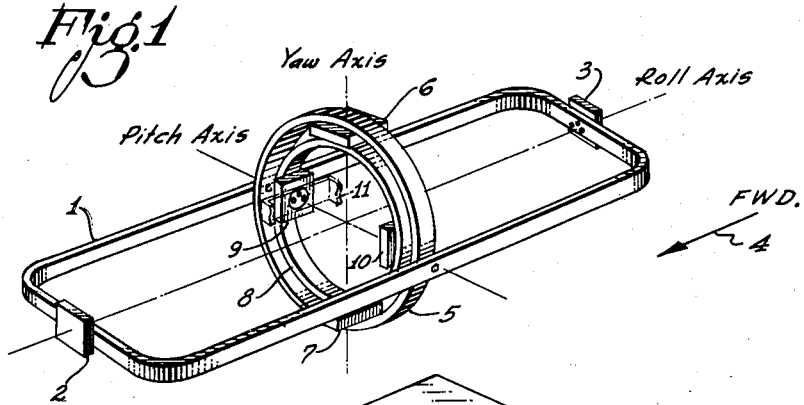
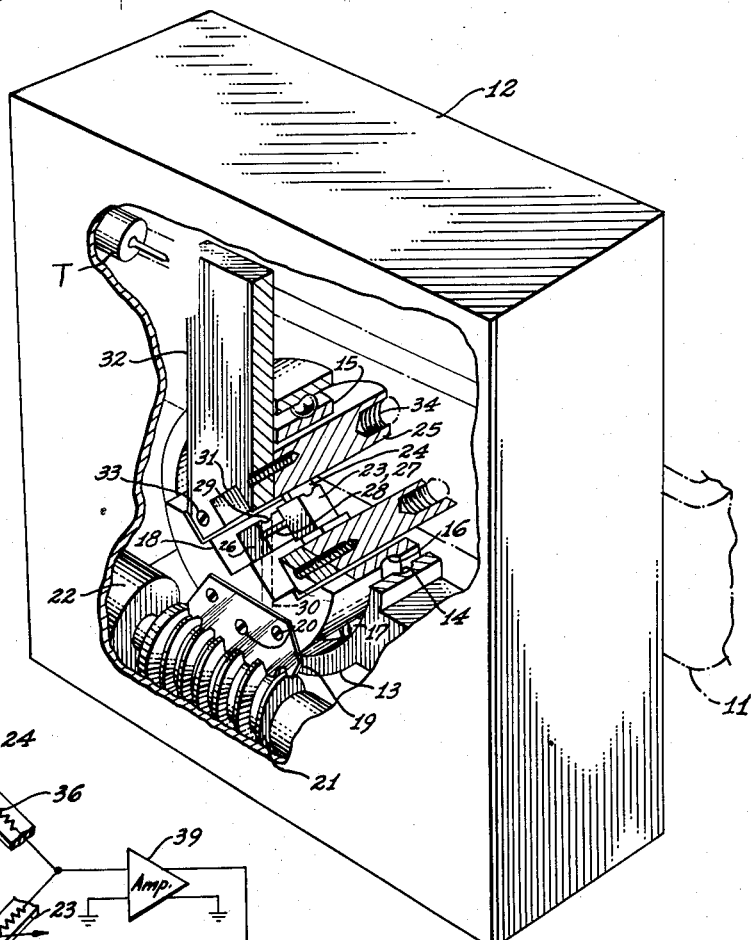
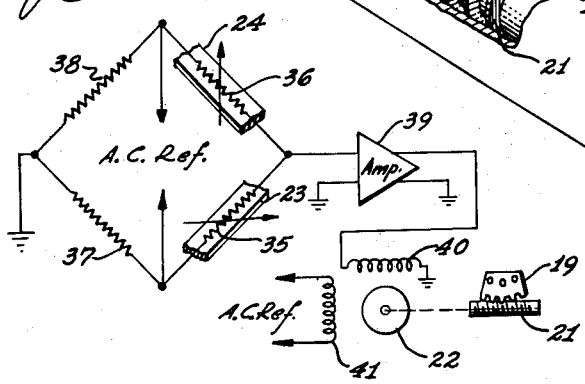
INVENTOR:
Thomas C. Leighton
By Forrest J. Lilly
Attorney

United States Patent Office 2,967,430
Patented Jan. 10, 1961

2,967,430

STABILIZER GIMBALS

Thomas C. Leighton, South Pasadena, Calif., assignor to Hycon Mfg. Company, Pasadena, Calif., a corporation of Delaware Filed July 28, 1958, Ser. No. 751,456

8 Claims. (Cl. 74—5)

My invention relates generally to stabilizers and more particularly to stabilizer gimbals including novel and useful gimbal ring flexure mounts.

Bearing friction in conventional gimbals introduces restraining torques in a stabilizing system that limit or restrict the degree of stabilization possible with the system. Flexure suspended gimbals in which gimbal rings are suspended on respective, suitably disposed, flexible crossed strips that define a pivot axis, can provide extremely close rate stability and have response capabilities far more exacting than that achievable with the conventional stabilizer gimbals. The flexure type gimbals, however, have a relatively smaller angular working range than the conventional bearing supported type gimbals.

It is an object of my invention to provide precise angular rate stabilizing gimbals having flexure mounts which are capable of operating over an angular range at least as great as that of conventional bearing supported gimbals.

Another object of this invention is to provide a flexure mount for extended range stabilizer gimbals wherein the flexures are continuously maintained within their permissible deflection range.

A further object of my invention is to provide flexure type stabilizing gimbals for high rate stabilization of a load about three mutually orthogonal axes and having a wide operating range about each axis.

Briefly, and in general terms, the foregoing and other objects are preferably accomplished by providing flexure mounts in three-axis stabilizing gimbals wherein each mount includes a load shaft that is suspended on a pair of crossed flexures to an inner bearing ring adapted to attach the flexures and be rotatably adjustable relative to a fixed outer bearing ring. Means for sensing excessive off-null stabilized load movement as, for example, indicated by the amount of flexure deflection, is provided and the sensing means produce an output signal which is used to adjust the inner bearing ring to reduce flexure deflection.

My invention possesses other objects and features, some of which together with the foregoing, will be set forth in the following detailed description of a preferred embodiment of my invention, and the invention will be more fully understood by reading the description with joint reference to the attached drawing, in which:

Figure 1 is a drawing of preferred three-axis stabilization gimbals adapted for use in aircraft;

Figure 2 is an enlarged perspective illustrating a flexure mount according to my invention; and Figure 3 is a circuit diagram showing a preferred control circuit for use with the flexure mount of Figure 2.

Three-axis stabilizing gimbals adapted for use in aircraft are shown in Figure 1. An outer rectangularly shaped gimbal ring 1 is supported along a roll axis by flexure mounts 2 and 3 which are secured to fixed airframe structure. The roll axis coincides or can be parallel with the longitudinal axis of the aircraft in which the forward direction is indicated by arrow 4. A circular intermediate gimbal ring 5 is diametrically secured to gimbal ring 1 centrally within the ring 1 such that the planes of gimbal rings 1 and 5 are mutually perpendicular. The diametrical attachment points of gimbal ring 5 normally lie on a pitch axis. Two other flexure mounts 6 and 7 are affixed to the gimbal ring 5 diametrically opposite each other. The flexure mounts 6 and 7 are positioned on a diameter perpendicular to the diameter between attachment points of gimbal ring 5 to gimbal ring 1, and establish a yaw axis which is normally perpendicular to both the roll and pitch axes. The mounts 6 and 7 support an inner gimbal ring 8 which is also circular, but is smaller than gimbal ring 5. Another pair of flexure mounts 9 and 10 are affixed to the inner gimbal ring 8 diametrically opposite each other, on a diameter perpendicular to the diameter connecting flexure mounts 6 and 7. When the gimbal ring 8 is concentric with the intermediate gimbal ring 5 such that the plane of gimbal ring 8 coincides with the plane of gimbal ring 5, the flexure mounts 9 and 10 lie on the pitch axis which is normally perpendicular to both the roll and yaw axes. The three axes (roll, yaw and pitch) in normal position are mutually orthogonal and intersect in a common pivot point as illustrated in Figure 1. The flexure mounts 9 and 10 support a load which is represented by a fragmentary frame member 11. The load carried by frame member 11 can, for example, be an aerial camera.

Figure 2 is an enlarged perspective of a flexure mount. The housing 12 is a regular hexahedron having rectangular sides and generally square front and back faces. The front face of the housing 12 is usually in direct contact with structure to which it is secured or attached, and the back face has a suitable cutout to permit connection with a supported object. The front face of housing 12 is shown partially broken away to reveal the flexure mount structure. An outer bearing ring 13 is rigidly affixed to the housing 12 and has a race 14 which is visible in the partial sectional view resulting from the removal of a quadrant of generally cylindrical structure. An inner bearing ring 15 has a corresponding race 16 and is held concentric to the outer ring 13 by a series of hardened steel balls 17 which ride in the races 14 and 16. The steel balls 17 can be installed conventionally (by the notch method, for example), and mounted in the usual metal retainer cage, if desired. The upper part of the inner ring 15 is as wide as the uniform width of the outer ring 13, but the lower part of inner ring 15 is wider and extends out in front some distance beyond the front face of the outer ring 13. The lower part of the inner ring 15 is not circular internally but has a W-shaped channel 18 in which the ends of the W are joggled, as can be seen in the illustration of Figure 2. A gear segment 19 is secured to the front extended face of the inner ring 15 by three screws 20. The gear segment 19 meshes with worm 21 which is axially driven by motor 22.

Flexures 23 and 24 support and mount a generally semi-circular shaft 25. The flexure 23 comprises two cubes 26 and 27 which are connected by a relatively thin strip 28. A flexure is similar in appearance to a miniature dumbell in which the spheres are replaced by cubes and the connecting bar is replaced by a thin, flat strip which can be as wide as the cubes. The cubes of each flexures are centrally drilled diagonally and tapped, producing a hole such as 29. A hole 30 is drilled vertically up through the inner ring 15 in front of race 16 and intersects symmetrically with the lower apex of the V half of the W-shaped channel 18. The cube 26 of flexure 23 can be secured by a screw passing up hole 30 and threading with the diagonal tapped hole 29. Similarly, another hole can be drilled behind race 16 to intersect with the other V half of the W-shaped channel 18, and the lower cube of the other flexure 24 can be secured to inner ring 15 like cube 26. The W-shaped channel 18 is channeled so that the cubes conform exactly with each V half and the connecting flat strips intersect each other symmetrically at right angles in an X, when viewed directly from the front. A top, plan view, of course, would show that the flat strips do not actually intersect but are positioned adjacently and separated by the race 16.

The semicircular cylindrical shaft 25 is also channeled on the inside sections to receive the upper cubes of the flexures 23 and 24. The upper channel 31 is M-shaped having bent-in ends. The length of shaft 25 is longer than the width of both the inner and outer rings 13 and 15. The shaft 25 is mounted to the flexures 23 and 24 so that the front shaft end extends beyond the front faces of the upper half ring sections of bearing rings 13 and 15, and the back shaft end extends out through the cutout in the back face of housing 12. Lever arm 32 is attached to the front end face of shaft 25 by three screws 33 and the lower end of lever arm 32 is machined to conform exactly with the M-shaped channel 31, and can be considered a part of it. The lever arm 32 is shown sectioned down the middle in Figure 2, and the deleted half is symmetrical to the half shown. The M-shaped channel 31 with bent-in ends can be fully reproduced by adding a symmetrical half of the lever arm 32. The shaft 25 is secured to the top cubes of the flexures 23 and 24 by screws (not shown) passing through holes drilled into the shaft 25 intersecting with the top apexes of the M-shaped channel 13 and threading with the diagonally tapped holes in the upper cubes, in a manner similar to that described for the lower cubes and inner ring 15. The upper cylindrical surface of shaft 25 is spaced concentrically apart from inner ring 15. The back end of shaft 25 extends out the cutout provided in the back face of housing 12 to mount a load. Three tapped holes 34 are provided in the back end face of shaft 25 and engage with bolts which pass through corresponding holes in the frame member 11. A torquer solenoid T affixed to housing 12 has its armature connected to the upper end of lever arm 32 for restraining or rotating shaft 25 on its flexures 23 and 24 when energized, to adjust frame member 11 and its attached load. It should be noted that the torquer solenoid T is a conventional linear solenoid and is part of a stabilizer control system which does not form a part of the present invention. The torquer solenoid T can be located outside the housing 12 if lever arm 32 is suitably connected to frame member 11 instead of the shaft 25.

Stabilization about roll, pitch and yaw axes is effected through the flexures in the mounts and a suitable control system therefor. Generally, the camera or load is isolated from external disturbing motions experienced by the aircraft or vehicle through stabilizing flexures which mount the camera or load. The flexures provide an extremely low friction pivot not equalled by ordinary bearings joints or pivots. The flexures, however, are limited in working range by their elastic characteristic, particularly for linear stabilization operation. The flexures, for example, should not be deflected more than a few degrees. My invention will permit a greatly increased range of load deflection while maintaining excellent stabilization continuously. Figure 3 is a circuit diagram which illustrates a preferred means for accomplishing control of a flexure mount.

A sensing device is employed to measure the amount of flexure deflection caused by external forces or actually produced by torquer solenoid T acting responsively in the stabilizer control system. A position sensor, for example, which is actuated by lever arm 32 can indicate the amount that the flexures are bent. More generally, the sensors measure in a stabilized mount the amount of departure of a stabilized load from null position, which is proportional to flexure deflection. The position sensor is adjusted to produce an output signal whenever the limit of permissible flexure deflection is reached. This signal is used to control the motor 22. A prefered sensing device can be a strain bridge as shown in Figure 3. Variable resistances 35 and 36 can be attached to the upper surfaces, for example, of the connecting strips of the flexures 23 and 24. These resistances are conventional strain measuring resistances which are available on thin paper or plastic strips that can be cemented to the top surfaces of the connecting flexure strips. The resistances 35 and 36 are connected in series to form one branch of the bridge and fixed resistances 37 and 38 are connected in series to form the other branch. The ends of the two resistance branches are both connected across a source of alternating reference voltage, and an output signal is obtained from across the centers of the bridge.

The output signal from the strain bridge is applied to the input of amplifier 39 and an amplified output signal is obtained which is applied to winding 40 of the motor 22, which can be a conventional servomotor. The other winding 41 of the servomotor is connected to the same source of alternating reference voltage that the ends of the strain bridge are connected to, in order to obtain the same phase signal. The output shaft of motor 22 is mechanically coupled to worm 21 which meshes with the gear segment 19. Due to inertia, friction, etc., the servomotor 22 requires approximately five volts, for example, on winding 40 before a mechanical output is obtained therefrom. By adjusting the gain of the amplifier 39 and/or varying the magnitude of the alternating reference voltage applied directly between the ends of the strain bridge, the output voltage from amplifier 39 is made to reach five volts in response to the output voltage appearing across the centers of the strain bridge when the flexures 23 and 24 are both bent one degree, for example. The motor 22 will then drive gear segment 19 and rotate inner ring 15 whenever the flexures 23 and 24 are bent to the predetermined amount which can be somewhat below the maximum limit of permissible deflection. The motor 22 is responsively connected to rotate the inner ring 15 in a direction which reduces the deflection of the flexures and maintain the flexures within their predetermined working range of one degree, for example.

The connecting strips of both flexures 23 and 24 are equally bent simultaneously, however, in opposite directions. Thus, when one flexure is bent concave upwards the other is bent concave downwards. Since the variable strain resistances 35 and 36 are both cemented to upper (or lower) surfaces of the connecting strip between flexure end cubes, when one resistance is increased the other is normally decreased an equal amount. The phase of the output signal from across the centers of the strain bridge accordingly reverses in phase whenever the flexures are respectively deflected in opposite directions, and the motor 22 will also rotate in an opposite direction responsively to reduce excessive flexure deflection. It is noted that intermittent adjusting motion produced by the motor 22 will not disturb the stabilized apparatus since the apparatus is fully isolated and essentially "floats" continuously on the flexures. The inner ring 15 is normally held completely rigid and fixed with substantially no play by the worm 21 and gear segment 19 structure combination.

Knuckle type flexure gimbals located near the center of gravity of a load and which are generally enveloped by the load, as contrasted from conventional gimbals having "distributed" gimbal rings which generally surround the load, can be similarly adapted for extended range stabilization. While a preferred embodiment of new and useful stabilizing gimbals having wide range flexure mounts has been described in detail, it is to be understood, however, that the particular embodiment of my invention described above and shown in the attached drawing is merely illustrative of and not restrictive of the broad invention, and that various changes in design structure and arrangement may be made without departing from the spirit and scope of the broader of the appended claims.

I claim:

1. In stabilization gimbals, an extended range flexure mount, comprising: a load member adapted to mount a load which is to be angularly stabilized; a support member; at least two adjacently positioned, oppositely inclined flexures connecting said load member to said support member, said flexures defining a pivot axis about which the load is stabilized; and means for rotating said support member about the pivot axis in response to a predetermined deflection condition of said flexures.

2. In stabilization gimbals, an extended range flexure mount, comprising: a shaft adapted to attach a load which is to be angularly stabilized; an inner bearing ring; at least two adjacently positioned, oppositely inclined flexures connecting said shaft to said inner bearing ring, said flexures defining a pivot axis about which the load is stabilized; an outer, fixed bearing ring concentric with said inner bearing ring; bearing means connecting said inner bearing ring and said outer bearing ring for concentric rotation of said inner bearing ring relative to said outer, fixed bearing ring; and means for rotating said inner bearing ring about the pivot axis in response to a predetermined deflection condition of said flexures.

3. The invention according to claim 2 wherein said latter means includes a flexure deflection sensor to produce an output signal for a predetermined deflection condition of said flexures, a motor adapted to be energized by the output signal, and means connecting with said motor for rotating said inner bearing ring relative to said outer, fixed bearing ring.

4. The invention according to claim 3 wherein said deflection sensor includes a strain bridge having variable resistance elements attached to said flexures for producing an output signal from said bridge according to the deflection of said flexures, and an amplifier for providing an output signal of sufficient magnitude to actuate said motor from the output signal of said bridge for a predetermined deflection condition of said flexures.

5. The invention according to claim 3 wherein said means connecting with said motor includes a worm connected to be driven by said motor, and a gear segment secured to said inner bearing ring and meshing with said worm to rotate said inner bearing ring.

6. Single axis stabilization gimbals, comprising: a gimbal ring for mounting a load; a first extended range flexure mount comprising a first shaft attached to a first point on said gimbal ring, a first inner bearing ring, a first pair of adjacently positioned, oppositely inclined flexures connecting said first shaft to said first inner bearing ring, said first pair of flexures defining a pivot axis, a first, outer fixed bearing ring concentric with said first inner bearing ring, and first bearing means connecting said first inner bearing ring for concentric rotation of said first inner bearing ring relative to said outer, fixed bearing ring; a second extended range flexure mount comprising a second shaft attached to a second point directly opposite the first point on said gimbal ring, a second inner bearing ring, a second pair of adjacently positioned, oppositely inclined flexures connecting said second shaft to said second inner bearing ring, said second pair of flexures defining the same pivot axis as said first pair of flexures, a second, outer fixed bearing ring concentric with said second inner bearing ring, and second bearing means connecting said second inner bearing ring for concentric rotation of said second inner bearing ring relative to said second outer, fixed bearing ring; and means for rotating said first and second inner rings about the pivot axis in response to a predetermined flexure condition of said first and second pair of flexures.

7. The invention according to claim 1 wherein said latter means includes a flexure deflection sensor to produce an output signal for a predetermined deflection condition on said flexures, a motor adapted to be energized by the output signal, and means connecting with said motor for rotating said support member relative to said load member to reduce the deflection condition of said flexures.

8. The invention according to claim 7 wherein said deflection sensor includes a strain bridge having variable resistance elements attached to said flexures for producing an output signal from said bridge according to the deflection of said flexures, and an amplifier for providing an output signal of sufficient magnitude to actuate said motor from the output signal of said bridge for a predetermined deflection condition of said flexures.

References Cited in the file of this patent

UNITED STATES PATENTS

| | | |
|---|---|---|
| 2,735,731 | Freebairn, et al. | Feb. 21, 1956 |
| 2,740,299 | Jewell | Apr. 3, 1956 |
| 2,754,465 | Brier | July 10, 1956 |
| 2,855,781 | Alburger | Oct. 14, 1958 |